(12) United States Patent
Jones et al.

(10) Patent No.: US 10,049,332 B2
(45) Date of Patent: Aug. 14, 2018

(54) QUEUING TASKS IN A COMPUTER SYSTEM BASED ON EVALUATING QUEUE INFORMATION AND CAPABILITY INFORMATION OF RESOURCES AGAINST A SET OF RULES

(71) Applicant: Accenture Global Services Limited, Dublin (IE)

(72) Inventors: David C. Jones, Waxhaw, NC (US); Sergio A. Salas, Charlotte, NC (US); John Fults, Charlotte, NC (US); Michael J. Flanagan, Charlotte, NC (US)

(73) Assignee: Accenture Global Services Limited, Dublin (IE)

( * ) Notice: Subject to any disclaimer, the term of this patent is extended or adjusted under 35 U.S.C. 154(b) by 65 days.

(21) Appl. No.: 14/644,975

(22) Filed: Mar. 11, 2015

(65) Prior Publication Data
US 2016/0266930 A1 Sep. 15, 2016

(51) Int. Cl.
G06Q 10/06 (2012.01)
G06Q 40/02 (2012.01)
(52) U.S. Cl.
CPC ....... G06Q 10/06311 (2013.01); G06Q 40/02 (2013.01)
(58) Field of Classification Search
CPC .................................................. G06F 9/5011
See application file for complete search history.

(56) References Cited

U.S. PATENT DOCUMENTS

| 6,134,530 | A | 10/2000 | Bunting et al. |
| 7,765,108 | B2 | 7/2010 | Goodall et al. |
| 8,046,281 | B1 | 10/2011 | Urrutia |
| 8,401,896 | B2 | 3/2013 | Wargin et al. |
| 9,141,432 | B2 * | 9/2015 | Chen .................. G06F 9/5044 |
| 9,947,050 | B1 * | 4/2018 | Pietrus ............. G06Q 10/06311 |
| 2004/0064402 | A1 * | 4/2004 | Dreyer .................. G06Q 40/00 705/38 |
| 2005/0091098 | A1 | 4/2005 | Brodersen et al. |
| 2005/0137968 | A1 * | 6/2005 | Mitchell ............... G06Q 30/02 705/38 |
| 2008/0148150 | A1 * | 6/2008 | Mall ...................... G06F 3/048 715/707 |
| 2010/0023385 | A1 * | 1/2010 | Galvan ............ G06Q 10/06398 705/7.42 |
| 2012/0215578 | A1 | 8/2012 | Swierz, III et al. |

(Continued)

OTHER PUBLICATIONS

Australian Office Action in Application No. 2016201545, dated Apr. 20, 2016, 7 pages.

(Continued)

Primary Examiner — Eric C Wai
Assistant Examiner — Jorge A Chu Joy-Davila
(74) Attorney, Agent, or Firm — Fish & Richardson P.C.

(57) ABSTRACT

Information related to tasks and resources is leveraged in a computer system to assign one or more new tasks to one or more resources. The approach relies upon historical and predictive data associated with the tasks and resources of a system to assign tasks to resources in a manner which seeks to optimize one or more qualities of task handling. Tasks can then be distributed to their respective resources according to a task assignment so that they may be handled.

20 Claims, 13 Drawing Sheets

(56) References Cited

U.S. PATENT DOCUMENTS

2013/0061203 A1* 3/2013 Gifford ................ G06F 9/5027
717/103
2013/0090990 A1* 4/2013 Howard ................ G06Q 10/06
705/7.41
2014/0081691 A1 3/2014 Wendell
2014/0136255 A1 5/2014 Grabovski et al.
2016/0078348 A1* 3/2016 Finch ...................... G06N 5/04
706/12

OTHER PUBLICATIONS

Australian Office Action for Application No. 2016201545, dated Sep. 29, 2016, 5 pages.

* cited by examiner

FIG. 10

QUEUING TASKS IN A COMPUTER SYSTEM BASED ON EVALUATING QUEUE INFORMATION AND CAPABILITY INFORMATION OF RESOURCES AGAINST A SET OF RULES

FIELD

This disclosure relates to queuing tasks in a computer system.

BACKGROUND

Tasks and the resources charged with handling the tasks are inseparable factors in system service performance. Each task comes with its own set of challenges and the capacity each subset of the resources can take on these challenges can be unique and ever-changing. However, tasks are often distributed to resources largely on the basis of a predefined queuing strategy. Accordingly, tasks may be assigned and distributed in a manner which fails to capitalize on potential advantages presented by the tasks being handled, the specific resources, or both.

SUMMARY

In one aspect, a computer-implemented method of distributing tasks among queues corresponding to a set of resources includes accessing task information for a task to be assigned to a queue of a resource for handling, accessing queue information descriptive of tasks included in queues of a set of resources available to handle tasks, accessing capability information for the set of resources available to handle tasks, and accessing, from electronic storage, a set of rules that control assignment of tasks to the set of resources to balance an amount of time taken to handle each task across the set of resources. The task information may indicate at least one requirement needed to handle the task and complexity of the task, the queue information may indicate a number of tasks included in each of the queues of the set of resources and complexity of each of the tasks included in the queues of the set of resources, and the capability information may indicate types of tasks each of the set of resources is able to handle and productivity of each of the set of resources in handling tasks. The computer-implemented method also includes evaluating, by at least one processor, at least the accessed task information, the accessed queue information, and the accessed capability information against the set of rules and selecting, by the at least one processor and from among the queues of the set of resources and based on evaluation results, the computer-implemented method includes selecting, a queue of a resource to which to assign the task. Based on selection of the queue of the resource to which to assign the task, the task may be sent to the selected queue by the at least one processor.

In some implementations, accessing task information for the task to be assigned to a queue of a resource for handling may include accessing task information for multiple tasks, each of which are to be assigned to a queue of a resource for handling, the task information indicating, for each of the multiple tasks, at least one requirement needed to handle each task and complexity of each task. Further, evaluating at least the accessed task information, the accessed queue information, and the accessed capability information against the set of rules may include evaluating, against the set of rules, task information for each task in the multiple tasks, the accessed queue information, and the accessed capability information. In some examples, selecting, from among the queues of the set of resources, a queue of a resource to which to assign the task may include, based on the evaluation results, selecting a particular task assignment model defining the queues of resources which the multiple tasks are to be assigned. In these examples, sending the task to the selected queue may include sending, in accordance with the particular task assignment model, the multiple tasks to multiple of the set of resources to be handled in parallel. In some implementations, evaluating task information for each task in the multiple tasks, the accessed queue information, and the accessed capability information against the set of rules may include generating a set of task assignment models and evaluating each task assignment model against the set of rules. In these implementations, selecting the particular task assignment model defining the queues of resources which the multiple tasks are to be assigned may include selecting the particular task assignment model from among the set of task assignment models. In some examples, the evaluation results may include a set of qualities for each of the task assignment models in the generated set of task assignment models, each set of qualities including qualities associated with the multiple tasks being handled by the set of resources as defined by the corresponding task assignment model. In these examples, selecting the particular task assignment model from among the set of task assignment models may include selecting the particular task assignment model based on the particular task assignment model optimizing the qualities included in its corresponding set of qualities relative to other of the task assignment models.

In addition, the capability information may include schedule information for each resource indicating when each resource is expected to be available for handling tasks. Further, evaluating at least the accessed task information, the accessed queue information, and the accessed capability information against the set of rules may include evaluating the schedule information for each resource.

In some examples, the at least one requirement needed to handle the task may include a requirement that the task is handled by a resource that is associated with a particular geographic location. In these examples, evaluating at least the accessed information, the accessed queue information, and the accessed capability information against the set of rules may include evaluating a requirement that the task is handled by a resource that is associated with a particular geographic location for each task.

In some implementations, the at least one requirement needed to handle the task may include a requirement that the task is handled by a particular point in time. In these implementations, evaluating at least the accessed information, the accessed queue information, and the accessed capability information against the set of rules may include evaluating a requirement that the task is handled by a particular point in time for each task.

In some implementations, each task may include a task of processing data associated with at least one loan application received by a lending entity. For example, the task of processing data associated with at least one loan application may be handled at least in part by a loan processor or an automated agent that automatically processes tasks associated with loan applications. In some implementations, the complexity may be based at least on application characteristics including characteristics of the at least one loan application, and applicant characteristics including characteristics of one or more applicants of the at least one loan application. Further, evaluating at least the accessed information, the accessed queue information, and the accessed capability information against the set of rules may include evaluating application characteristics and applicant characteristics for each task. In these implementations, the complexity of each task may be reflective of an amount of time historically needed to process data associated with loan applications having the application characteristics and the applicant characteristics. In addition, evaluating at least the accessed information, the accessed queue information, and the accessed capability information against the set of rules may include evaluating complexity information reflective of an amount of time historically needed to process data associated with loan applications have the application characteristics and the applicant characteristics for each task.

In some examples, the capability information indicating the types of tasks each of the set of resources is able to handle, may include resource credential information reflective of at least one task-handling licensure level of each resource. In these examples, evaluating at least the accessed information, the accessed queue information, and the accessed capability information against the set of rules may include evaluating resource credential information reflective of at least one task-handling licensure level of each resource.

In some implementations, the capability information indicating productivity of each of the set of resources in handling tasks may include a productivity score reflective of a quantity of tasks completed by each resource within a predetermined period of time. In these implementations, evaluating at least the accessed information, the accessed queue information, and the accessed capability information against the set of rules may include evaluating a productivity score for each resource reflective of a quantity of tasks completed by the resource within a predetermined period of time. In some examples, the predetermined period of time may include a moving window of time, the moving window of time including a current time. In these examples, evaluating at least the accessed information, the accessed queue information, and the accessed capability information against the set of rules may include evaluating the productivity score for each resource reflective of the quantity of tasks completed by the resource with a moving time window including a current time.

In some examples, the set of rules that control assignment of tasks to the set of resources to balance an amount of time taken to handle each task across the set of resources may further control assignment of tasks to the set of resources to increase queue capacity at a predetermined rate for more-recently deployed resources and maintain queue capacity for less-recently resources. Further, evaluating at least the accessed information, the accessed queue information, and the accessed capability information against the set of rules may include evaluating deployment information for each resource.

In some implementations, evaluating at least the accessed task information, the accessed queue information, and the accessed capability information against the set of rules and, based on evaluation results, selecting a queue of a resource to which to assign the task, may include predicting one or more qualities of a process of the task being handled by each resource and performing a linear programming optimization process to determine a task assignment associated with at least one optimal predicted quality for the set of resources. In these implementations, the computer-implemented method may further include receiving resource feedback indicating one or more qualities of the process of the task being handled by the resource associated with the selected queue and evaluating the one or more predicted qualities of the process of the task being handled by the resource associated with the selected queue against the one or more qualities of the process of the task being handled by the resource associated with the selected queue indicated by the resource feedback. Based on the evaluation results, one or more of the task information, queue information, capability information, and set of rules may be updated.

In another aspect, a task distribution system includes at least one processor and at least one memory coupled to the at least one processor having stored thereon instructions which, when executed by the at least one processor, causes the at least one processor to perform operations. The operations may include accessing task information for a task to be assigned to a queue of a resource for handling, accessing queue information descriptive of tasks included in queues of a set of resources available to handle tasks, accessing capability information for the set of resources available to handle tasks, and accessing, from electronic storage, a set of rules that control assignment of tasks to the set of resources to balance an amount of time taken to handle each task across the set of resources. The task information may indicate at least one requirement needed to handle the task and complexity of the task, the queue information may indicate a number of tasks included in each of the queues of the set of resources and complexity of each of the tasks included in the queues of the set of resources, and the capability information may indicate types of tasks each of the set of resources is able to handle and productivity of each of the set of resources in handling tasks. The operations may also include evaluating, by at least one processor, at least the accessed task information, the accessed queue information, and the accessed capability information against the set of rules and selecting, by the at least one processor and from among the queues of the set of resources and based on evaluation results, the operations include selecting, a queue of a resource to which to assign the task. Based on selection of the queue of the resource to which to assign the task, the task may be sent to the selected queue by the at least one processor.

In yet another aspect, at least one computer-readable storage medium is encoded with executable instructions that, when executed by at least one processor, cause the at least one processor to perform operations. The operations may include accessing task information for a task to be assigned to a queue of a resource for handling, accessing queue information descriptive of tasks included in queues of a set of resources available to handle tasks, accessing capability information for the set of resources available to handle tasks, and accessing, from electronic storage, a set of rules that control assignment of tasks to the set of resources to balance an amount of time taken to handle each task across the set of resources. The task information may indicate at least one requirement needed to handle the task and complexity of the task, the queue information may indicate a number of tasks included in each of the queues of the set of resources and complexity of each of the tasks included in the queues of the set of resources, and the capability information may indicate types of tasks each of the set of resources is able to handle and productivity of each of the set of resources in handling tasks. The operations may also include evaluating, by at least one processor, at least the accessed task information, the accessed queue information, and the accessed capability information against the set of rules and selecting, by the at least one processor and from among the queues of the set of resources and based on evaluation results, the operations include selecting, a queue of a resource to which to assign the task. Based on selection of the queue of the resource to which to assign the task, the task may be sent to the selected queue by the at least one processor.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 5A, 5B, 7, 8, and 10 are diagrams illustrating data associated with exemplary processes.

DETAILED DESCRIPTION

In some implementations, a multi-dimensional approach leverages information related to tasks and information related to resources to assign one or more new tasks to one or more resources. The approach relies upon historical and predictive data associated with the tasks and resources of a particular organization or system to assign tasks to resources in a manner which seeks to optimize one or more qualities of task handling.

Figure 1:
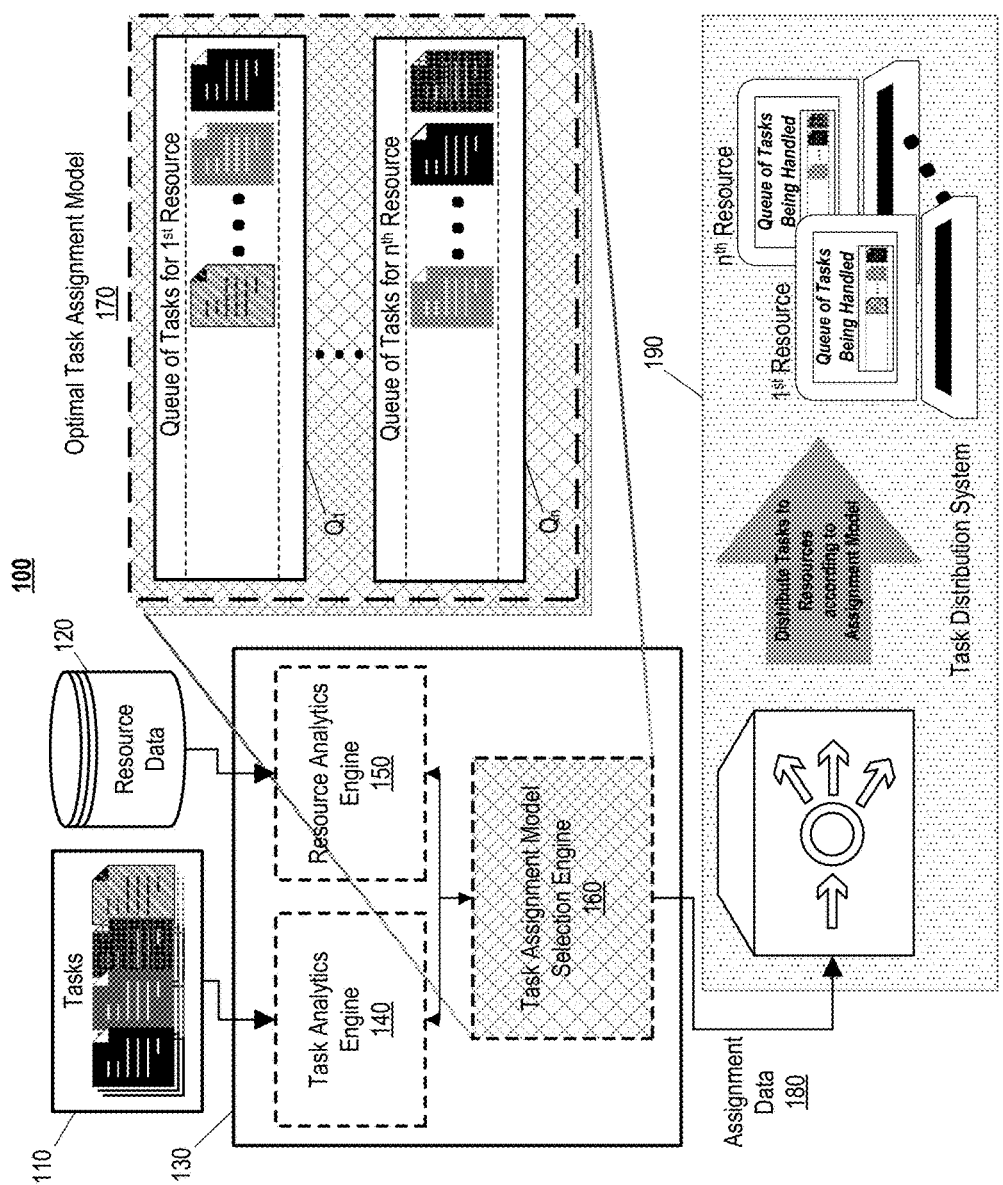
FIGS. 1, 2, 4, 6, 9, 11, and 12 are diagrams of exemplary systems.

FIG. 1 illustrates an exemplary system 100 for assigning and distributing tasks to resources. The system 100 includes task data storage 110 that stores task data associated with one or more new tasks and a resource database 120 that stores resource data associated with one or more resources that handle tasks. The system 100 also includes a computing device 130 that provides data regarding how the one or more new tasks could be distributed to the one or more resources based at least on input of task and resource information. In some implementations, each resource has a queue of tasks that have been assigned to them for handling, and computing device 130 may further provide data regarding how the one or more new tasks could be distributed to the queues of the one or more resources based at least on input of task and resource information. Although a data storage and database are shown for storing task data and resource data respectively, more or fewer databases or other data storage systems may be used to store the task data and resource data.

The task data storage 110 stores task data associated with one or more new tasks. The task data associated with each resource or group of tasks may include task information indicating at least one requirement needed to handle the task and complexity of the task. The task information may include information including or relating to one or more of a type (e.g., nature, classification, etc.), origin (e.g. any parties or entities associated with generating the task, a location of origin, etc.), timing (e.g. the date and time the task was generated, a period of time which the task must be handled, due date, etc.), details regarding how the task is to be performed, or any other information that suggests or correlates to attributes of a task's requirements. In some implementations, the task data for each resource or group of tasks may take the form of task information, materials that are part of associated tasks and task-handling performance, and metadata associated with one or more of the resource information and materials. The task data stored in the task data storage 110 may originate from any number of sources and includes historical information, real-time information, or both.

The resource database 120 stores resource data about one or more resources or groups of resources that handle tasks. The resource data associated with each resource or group of resources may include queue information descriptive of tasks included in the queue of each resource or group of resources and capability information. The queue information and capability information may include information including or relating to one or more of resource position (e.g. extent of task-handling responsibilities and hierarchical position with respect to other resources or groups of resources, etc.), credentials (e.g. levels of licensure, levels of access, permissions, types and quantities of tasks capable of handling, etc.), service history (e.g. date of deployment, duration of service, etc.), performance (e.g. productivity, efficiency, and any other statistical metrics that quantify one or more aspects of task-handling performance generally and with respect to one or more resources or groups of resources, etc.), schedule (e.g. expected dates and hours of service or any other type of information associated with a resource's availability to handle tasks or lack thereof, etc.), queue status (e.g. types of tasks in each queue, quantity of tasks in each queue, complexity of tasks in each queue, capacity of each queue, and any other statistical metrics that quantify one or more aspects of each queue generally with respect to one or more other queues, etc.), or any other information that suggests or correlates to attributes of a resource's duties, availability, or track record. In some implementations, the resource data for each resource or group of resources may take the form of resource information, materials that are part of associated tasks and task-handling performance, and metadata associated with one or more of the resource information and materials. The resource data stored in the resource database 120 may originate from any number of sources and includes historical information, real-time information, or both.

In some implementations, computing device 130 includes task analytics engine 140 and resource analytics engine 150 for performing analysis on task data from task data storage 110 and resource database 120. The task analytics engine 140 may evaluate task data to characterize one or more aspects of new tasks. Similarly, the resource analytics engine 150 may evaluate resource data to characterize one or more aspects of one or more resources. The characterization of one or more aspects may include classifying, scoring, comparing, and ranking a variety of aspects of tasks and resources. In some examples, the task analytics engine 140 and resource analytics engine 150 share information with each other to produce larger-scale analytics reflective of historical and predicted relationships between tasks, resources, and handling processes. Statistical techniques may be performed on the task data and resource data to map or correlate attributes of the input (tasks) and attributes of the system (resources) to attributes of the output (completed tasks). The statistical techniques may include ANOVA (Analysis of Variance), regression analysis, and Scatterplot. For example, consider a new task of delivering a package. In this example, the task analytics engine 140 could characterize the location of the delivery destination, traffic associated with the location, altitude of the location, the recipient of the package, the weight of the package, the dimensions of the package, the level of care the package is to be treated with, equipment required for transportation, distance between shipping center and destination, and the like.

Further, the task analytics engine 140 and resource analytics engine 150 could share information to determine how long it has historically taken for similar deliveries (e.g. similar packages delivered under similar conditions, etc.) to be completed, in order to generate a score or prediction reflective of how long it might take to handle the new task or generate a score for the task reflective of a measure of complexity in handling the task. Similarly, the resource analytics engine 150 could provide performance analytics reflective of how well a particular resource may handle the new task based at least in part on the resource's historical handling of similar tasks (e.g. similar deliveries, etc.) and the resource's current productivity. In some implementations, the task data and resource data can be subjected to analysis, such as that which is described above, upstream from computing device 130. In these implementations, computing device 130 may rely upon one or more upstream sources to supplement a portion of the analytics capable of being performed by the task analytics engine 140 and resource analytics engine 150. In some examples, the computing device 130 relies entirely on one or more upstream sources for the analytics described.

In another example, the system 100 may be utilized for queueing loan application processing tasks associated with the mortgage industry. In this example, the task analytics engine 140 could assess task factors such as loan type, state licensure requirements, due date, underwriting approval levels required, subordination requirements, borrower employment, property type, property flood zone, loan to value ratio, and private mortgage insurance requirements. The resource analytics engine 150, in this example, could assess the licensing, schedule and capability requirements of the available resources as well as current load information and historic performance related to the specific type of task being assigned. The resource analytics engine 150 could also provide performance analytics reflective of how well a particular resource may handle the new task based at least in part on the resource's historical handling of similar tasks (e.g. processing applications for similar loan types, etc.) and the resource's current productivity.

The information made available by sources 110, 120, 140, and 150 may include, at a high-level, task information indicating at least one requirement needed to handle the task and the complexity of the task, queue information indicating a number of tasks included in each of the queues of the set of resources and complexity of each of the tasks included in the queues of the set of resources, and capability information indicating types of tasks each of the set of resources is able to handle and productivity of each of the set of resources in handling tasks.

The computing device 130 also includes a task assignment model selection engine 160. The task assignment model selection engine 160 functions to assign new tasks to resources for handling. The assignments determined by the task assignment model selection engine 160 can be used by one or more systems as basis to distribute new tasks to resources. In these implementations, the task assignment model selection engine 160 determines a queue of a resource to which to assign the particular new task and may further determine an exact position (e.g., beginning, middle, end, etc.) in the queue of the resource to which to assign the particular task. The manner in which the task assignment model selection engine 160 assigns new tasks to resources is strategic and dynamic. The task assignment model selection engine 160 operates with the objective of taking every potential advantage presented by the new tasks, resources, or both in order to optimize the task-handling process. The task assignment model selection engine 160 accesses the information discussed above made available by sources 110, 120, 140, and 150 (e.g. task information, queue information, capability information, etc.) in order to identify potential advantages. For example, the task assignment model selection engine 160 may determine that a particular new task would likely be processed quicker if it is assigned to Resource A than it would if it is assigned to Resource B, and may accordingly assign the task to Resource A. In some implementations the task assignment model selection engine 160 may use one or more linear programming optimization models, one or more constraint-based models, or logical cascade discrimination to determine the best resource for the task.

In some examples, the task assignment model selection engine 160 accesses the task information, queue information, and capability information and evaluates them against a set of rules in order to determine task assignments. The set of rules, which can be either locally or remotely accessed by the task assignment model selection engine 160, includes both business constraint rules and optimization rules. Business constraint rules define the various task and resource pairings that are permitted and not permitted. That is, the business constraint rules are the various constraints that define which resources are allowed to handle which types of tasks, and vice versa. For example, a business constraint for a task of encrypting a sensitive message might be that the resource charged with handling the task must be cleared for handling sensitive matters. In this example, the set of rules would ensure that such a task is assigned to a resource with the appropriate clearance. In another example, a particular task has a requirement that it must be completed this week. In this example, the business constraints would exclude resources which are not in service this week from consideration. Any number of business constraint rules can apply to a given task or resource. The business constraint rules are always obeyed by the task assignment model selection engine 160, as it will only consider assigning each task to the subset of resources eligible to handle such a task.

In some implementations, the business constraint rules are the first rules applied. In doing so, the task assignment model selection engine 160 determines, for each task, the specific subset of resources to which the task could potentially be assigned. In these implementations, the task assignment model selection engine 160 then applies optimization rules. The optimization rules are those which ensure that the assignments made satisfy a criteria to the greatest extent. In the clearance example discussed above, the business constraint rules identify a specific subset of resources with the appropriate clearance to handle the task. In this example, optimization rules then enable the task assignment model selection engine 160 to select a particular resource, from among the subset of resources with the appropriate clearance, which is expected to encrypt the sensitive message in the smallest amount of time. The particular resource selected, in this example, was the resource that the task assignment model selection engine had predicted to yield the quickest turnaround time (e.g. satisfy time-related criteria to a greater extent than the rest of the resources in the specific subset). In some examples, the optimization rules may provide for the optimization of multiple qualities of task handling. That is, the resource selected for each task is the one which best satisfies a number of criteria. The business constraint rules and optimization rules may be used simultaneously by the task assignment model selection engine 160 to generate task assignment models.

The optimization rules can consider the elements of system 100 on any of a variety of levels of scale when determining the optimal or "best" assignment options. In some implementations, each new task is assigned to a resource in a manner irrespective of the other new tasks. In these implementations, the task assignment model engine 160 may sequentially assign each new task on an as-needed basis. In some examples, new tasks are assigned to resources in accordance with a particular task assignment model. In these examples, the optimization rules enable the task assignment model selection engine 160 to select the optimal or "best" assignment model for system 100. A task assignment model may define how multiple new tasks are to be assigned to multiple resources. The optimal task assignment model 170 is the task assignment model which, out of a subset of task assignment models that are permitted by the business constraint rules, best satisfies a number of criteria relating to qualities of task handling. In a system with many new tasks and many resources, it is clear that a multitude of task assignment models are possible. For instance, the optimal task assignment model 170 may be the task assignment model which best balances an amount of time taken to handle each task across a set of resources. That is, the optimal task assignment model 170 may be the task assignment model which has been predicted to maximize an efficiency across a set of resources. The optimal task assignment model 170 could also be the model that acts to most evenly distribute tasks. For instance, this might allow resources to have a balanced queue of tasks such that no single resource is unfairly charged with handling an abnormal quantity of complex tasks or handling an abnormal quantity of simple tasks. In some implementations, an order of prioritization is considered in optimization, where an optimal task assignment model 170 is one which has high-priority tasks positioned as close as possible to the front-end of their respective queues. Such a model would allow tasks to be handled in a particular order, according to their priority. The prioritization could relate to a particular time at which each task needs to be completed by, on a first-in-first-out (FIFO) basis, or both. In some implementations, the task assignment model selection engine 160 uses the business constraint rules to generate a set of possible task assignment models, and evaluates the set of possible task assignment models against the optimization rules to select the optimal task assignment model 170. The optimization rules can be dynamic and formulated on the basis of any of the data discussed above from sources 110, 120, 140, and 150, as well as user-defined parameters. The data discussed above can be used in the optimization rules as feedback that allows the task assignment model selection engine 160 to refine task assignment in an adaptive manner. For instance, the task assignment model selection engine 160 could determine, based on such feedback, how effective previously selected task assignment models were in yielding the predicted results. In some examples, the task assignment model selection engine 160 determines an error between predicted qualities of task-handling under a particular task assignment model and the actual qualities of task-handling under the particular task assignment model after it has been selected, and uses the error to improve task assignment model evaluation.

In fully applying the optimization rules, the task assignment model selection engine 160 selects a resource to which to assign each task. In some examples, the task assignment model selection engine 160 selects a queue of a resource to which to assign each task. Upon effectively determining task assignment, the task assignment model selection engine 160 outputs assignment data 180, which reflects the task assignment selected. In some implementations, assignment data 180 is accessed by a task distribution system 190 to distribute the tasks accordingly. The task distribution system 190 may communicate the tasks which are to be handled to each resource. In some implementations, the task distribution system 190 directly manages the queue of each resource. In these implementations, the task distribution system 190 updates queues using assignment data 180 and sends the updates or queues to the resources. In some examples, the resources may handle the distributed tasks in parallel, as depicted by parallel queues $Q_1$ and $Q_n$ of optimal task assignment model 170.

Figure 2:
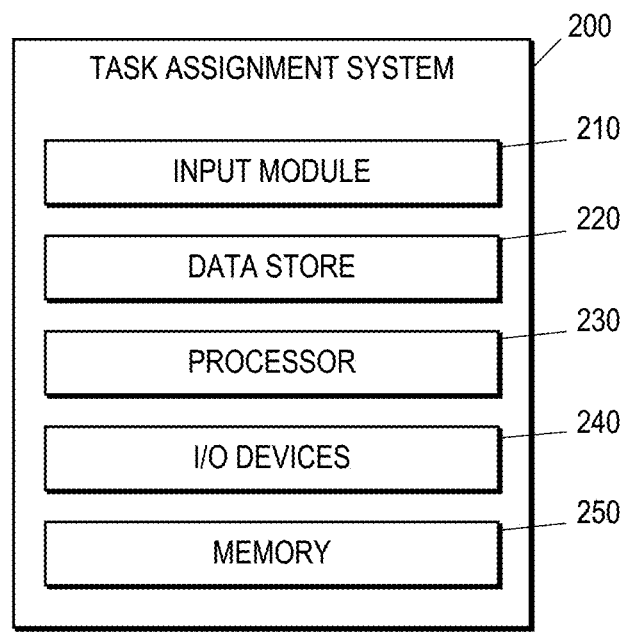

FIG. 2 illustrates an exemplary task assignment system 200 for determining task assignments. The system 200 includes an input module 210, a data store 220, one or more processors 230, one or more I/O (Input/Output) devices 240, and memory 250. The input module 220 may be used to input any type of information accepted by a prediction model leveraged by the system 200. For example, the input module 210 may be used to receive task information, queue information, capability information, and feedback information, as well as information which may be used for determining the sets of rules, task assignment models, and/or user-defined parameters. In some implementations, data from the input module 210 is stored in the data store 220. The data included in the data store 220 may include, for example, task information, queue information, capability information, sets of rules, feedback information, parameters, and task assignment models.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of objects. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3:
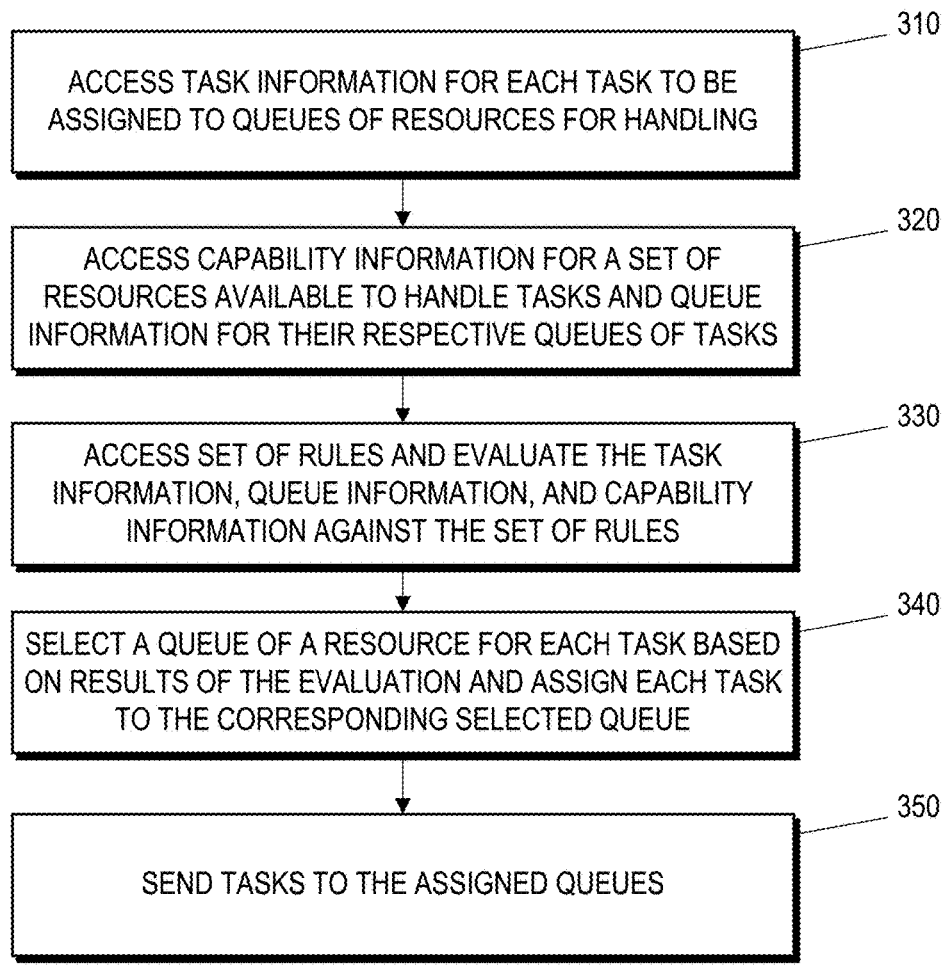
FIG. 3 is a flowchart of an exemplary process.

FIG. 3 illustrates an example process 300 for providing task assignment based on task data and resource data. The operations of the process 300 are described generally as being performed by the system 200. In some implementations, operations of the process 300 may be performed by one or more processors included in one or more electronic devices.

The system 200 accesses task information for each task to be assigned to queues of resources for handling (310). The need to handle new tasks may arise to address both internal and external events of a system or organization associated with system 200. For example, an event can include receiving a request from a client to render services. System 200 may identify such events and initialize a task to address system needs created by the events or identify a new task from input data received from a variety of sources. For instance, the system 200 receives task information provided by a task data storage, resource database, task analytics engine, and resource analytics engine. The task information may include any type of data that may be used to assign each task to a corresponding resource associated with system 200, such as one or more requirements needed to handle each task and complexity of the task as described above. The requirements are used by system 200 to assign tasks properly (e.g. to compatible resources) and the complexity is used by system 200 to assign tasks effectively (e.g. in a manner that allows the task to be handled in a timely manner without placing an excessive load or burden on the resource to which it is assigned). In the delivery example discussed above, requirements may be that the package is to be delivered within 24 hours and that the resource delivering the package (e.g. electro-mechanical device, automobile, etc.) be large enough to transport a package that occupies 465 square feet of space. With this information, the system 200 would only consider assigning the task to resources that are scheduled to be in-service for the next 24 hours and have at least 465 square feet of free space for the package. In this example, complexity information could indicate an estimated amount of time or needed to deliver the package. With this information, the system 200 could operate to optimize delivery logistics by assigning the delivery task to a resource that is predicted to be able to deliver a set of already-assigned packages (e.g. having been assigned to the resource before the current task was initialized), but still have time left over to perform the task before the end of the day. Similarly, in the example pertaining to the mortgage industry, this assignment can balance loan complexity and delivery requirements with resources that have the skill, capacity, and availability to deliver the given loan complexity within the prescribed time frame. By identifying the demands of each task through its task information, system 200 can assign tasks to resources best suited to meet those demands. In some examples, system 200 uses task-performance feedback to help improve the accuracy and reliability of information such as task complexity.

The system 200 further accesses capability information for a set of resources available and queue information for their respective queues of tasks (320). For instance, the system 200 receives capability information provided by a task data storage, resource database, task analytics engine, and resource analytics engine. The capability information may include any type of data that may be used to assign each task to a corresponding resource, such as the types of tasks each of the set of resources is able to handle and productivity of each of the set of resource in handling tasks. For example, capability information for a resource that is a software agent might include a list of compatible file formats, level of machine-learning or artificial intelligence exhibited, type and location of hardware on which it resides, scheduling, process execution rates, and the like. For instance, the system 200 can consider capability information in conjunction with task information to determine whether a given task and given resource are compatible.

The queue information may include any type of data that can be used to assign each task to a corresponding resource, such as the number of tasks included in each of the queues of the set of resources and complexity of each of the tasks included in the queues of the set of resources. In the mortgage industry example, this queue information may include the number, complexity, and status of loans currently assigned to a given resource, as well as a projection of the workload (e.g., "days of inventory") that the queue represents. The queue information provides system 200 with an overview of the amount of "work" each resource has ahead of them. This information is used by system 200 to determine if a resource will soon be in need of new tasks or if it already has plenty of tasks to complete. By evaluating this information for each resource, a load of incoming tasks can be effectively balanced and handled by the set of resources efficiently.

Figure 4:
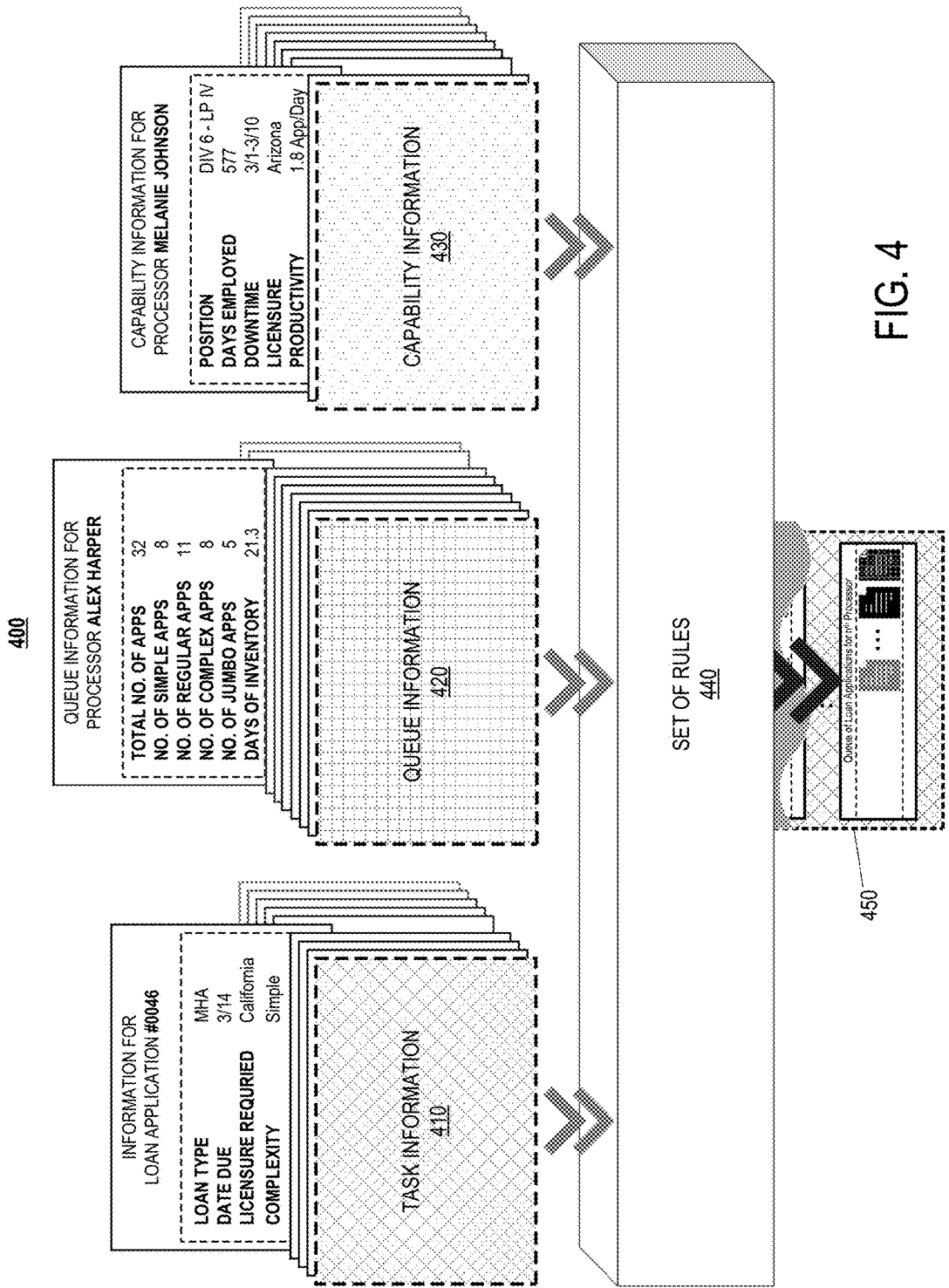

FIG. 4 illustrates a diagram for an exemplary system 400 which assigns new tasks to resources on the basis of accessed task information, accessed queue information, and accessed capability information. Specifically, the system 400 includes a set of rules 440 which it applies to task information 410, queue information 420, and capability information 430 in determining which one or more resources to which to assign one or more new tasks. The set of rules 440 may include, but is not limited to, business constraint rules and optimization rules as described above. In the example illustrated in FIG. 4, each new task includes processing a particular loan application received by a lending entity. For instance, the loan application could be one which was submitted to the lending entity (e.g. bank, financial institution, investor, etc.) by an applicant (e.g. prospective borrower, etc.) in applying for a loan (e.g. mortgage, etc.). The resources that are charged with handling the tasks, could be rational agents such as loan processors and automated agents that handle tasks for the lending entity. The task-handling might include reviewing a given loan application as part of a process of determining whether the lending entity should provide the applicant with the requested loan.

The task information 410 is made available by a task data storage, resource database, task analytics engine, and resource analytics engine. The information may include any type of data that may be used to assign each task to a corresponding resource, such as one or more requirements needed to handle each task and complexity of the task as described above. The task information 410 could originate from a database of already-submitted loan applications. As shown, task information 410 includes task information for a set of new tasks, including a task associated with loan application #0046. In the example illustrated in FIG. 4, the task information for loan application #0046 reflects that the loan application requires that the resource be licensed in the state of California and that the complexity of the task is "simple". When evaluated against the set of rules 440, system 400 identifies that a requirement of handling this task (e.g. processing loan application #0046) that the loan processor or automated agent have California licensure. Therefore, system 400 will exclusively consider assigning loan application #0046 to loan processors or automated agents licensed in the state of California. In some implementations, the geographic location of each resource can be the geographic location of which the resource holds licensure. The complexity of the task may be a score produced by a task analytics engine, resource analytics engine, or both (as described above) that is reflective of a predicted level of difficulty associated with handling the task or predicted amount of time required to handle the task. When evaluated against the set of rules 440, the system 400 identifies this complexity and may consider it against optimization rules in determining to which resource to assign the task. In this example, the complexity score associated with a task of handling a loan application may be based at least on application characteristics and applicant characteristics associated with the one or more applications of the loan application. As previously described, this information can be provided at least by a task analytics engine and resource analytics engine to provide a complexity score for each task that is based at least in part on analytics regarding loan applications with historically-similar characteristics. Furthermore, the complexity score in this example (e.g. loan application for a mortgage) may be based on task characteristics such as applicant FICO credit score, loan amount, property type, occupancy, applicant employment status, and any other information known in the art to be included in or suggested by a loan application.

The queue information 420 is made available by a task data storage, resource database, task analytics engine, and resource analytics engine. The information may include any type of data that may be used to assign each task to a corresponding resource, such as the number of tasks included in each of the queues of the set of resources and complexity of each of the tasks included in the queues of the set of resources. FIG. 4 illustrates queue information 420 for a set of loan processors, including a loan processor by the name of Alex Harper. As shown, the queue information 420 for Alex Harper is reflective of the makeup of his queue of loan applications that have been assigned to him but that he has yet to handle (e.g. process). Optimization rules of the set of rules 440, as described above, might operate with the objective of assigning tasks in a manner which most evenly balances the queues of the resources in terms of average time to process each task. In the example of Alex Harper, it can be seen that Alex Harper has 32 tasks (loan applications to process) in his queue, including 8 applications that have a complexity score of "simple". Therefore, 25% of the tasks assigned to Alex are simple in complexity. Queue metadata, which can be included in queue information 420 and provided by way of analytics as described above, might indicate that 36% of the average loan processor's queue are simple in complexity. By applying optimization rules of the set of rules 440 (to balance queues of tasks across resources on the basis of complexity) to task information 410 and queue information 420, system 400 may elect to assign loan application #0046 to Alex Harper over the average loan processor. However, the business constraint rules of the set of rules 440 would only permit loan application #0046 to be assigned to Alex if he is located or registered in the state of California.

The capability information 430 is made available by a task data storage, resource database, task analytics engine, and resource analytics engine. The information may include any type of data that may be used to assign each task to a corresponding resource, such as the types of tasks each of the set of resources is able to handle and productivity of each of the set of resources in the set of resources. FIG. 4 illustrates capability information 430 for a set of loan processors, including a loan processor by the name of Melanie Johnson. The types of tasks that Melanie is able to handle can be indicated, at least in part, by her position and licensure. For example, Melanie is able to handle tasks that require the loan processor to be licensed in the state of Arizona. In this example, Melanie would not be considered by set of rules 440 to handle task information 410 because she is not licensed in the state of California. In another example, task information for new tasks along with Melanie's queue information and capability information could be used by the set of rules to strategically design her queue such that she may be able to continue working at her current pace (1.8 applications per day), go on vacation from March $1^{st}$ to March $10^{th}$, and then resume working at her current pace without missing any task due dates or deadlines. That is, the resource's schedule information can be relied upon in applying optimization rules.

Referring again to FIG. 3, the system 200 accesses a set of rules and evaluates the task information, queue information, and capability information against the set of rules (330). For instance, the system 200 evaluates this information against business constraint rules and optimization rules, as described above, to generate evaluation results that are used in selecting the queue to which to assign each task. In some implementations, the system 200 may operate to sequentially assign each new task on an as-needed basis. In these implementations, the task information evaluated in 330 may be limited to the task information associated with the given task or may include task information for every new task. System 200 then selects a queue of a resource for the task based on the results of the evaluation and assign each task to the corresponding selected queue (340). The task is then sent to the assigned queue (350) and then process 300 is repeated for one of any other new tasks that needs to be assigned to a queue of a resource for handling.

In some implementations, system 200 operates to select a particular task assignment model and assign new tasks to resources in accordance with the particular task assignment model (340). In these implementations, the optimization rules enable the system 200 to select the optimal or "best" assignment model, as described above. In order to identify the optimal task assignment model, system 200 generates a set of task assignment models, each of which comply with the business constraint rules of the set of rules. The system 200 then scrutinizes each task assignment model in the generated set of task assignment models with respect to criteria as defined in the optimization rules. The evaluation results include the set of task assignment models as well as any of a variety of data associated with the predicted qualities of task-handling yielded by each model. According to the objectives of the system 200, a particular task assignment model is selected, from among the set of generated task assignment models, as the optimal or best way in which to assign the tasks (340). The tasks can then be sent to the queues to which they have been assigned so that the resources may handle them (350).

Referring again to FIG. 4, assignment data 450 is selected for the new tasks. The assignment data 450 includes information indicating the resource to which one or more tasks have been assigned. In some implementations, the assignment data 450 reflects the optimal task assignment model. In addition to the specific task assignments, assignment data 450 can also include a variety of other historical or predicted information associated with information provided by a task data storage, resource database, task analytics engine, resource analytics engine, and task assignment model selection engine 160. Accordingly, the assignment data 450 may take the form of one or more reports that can be provided to one or more systems such as a task distribution system to enable the distribution of tasks to their assigned queues, a system associated with an administrator, and a resource managing system associated with one or more entities that oversee task handling. The one or more reports may include one or more of detailed instructions for distributing tasks, summaries, spreadsheets, data visualization graphics, and any other information to enable an understanding of the task assignment and qualities of the task-handling process.

Figure 5A:
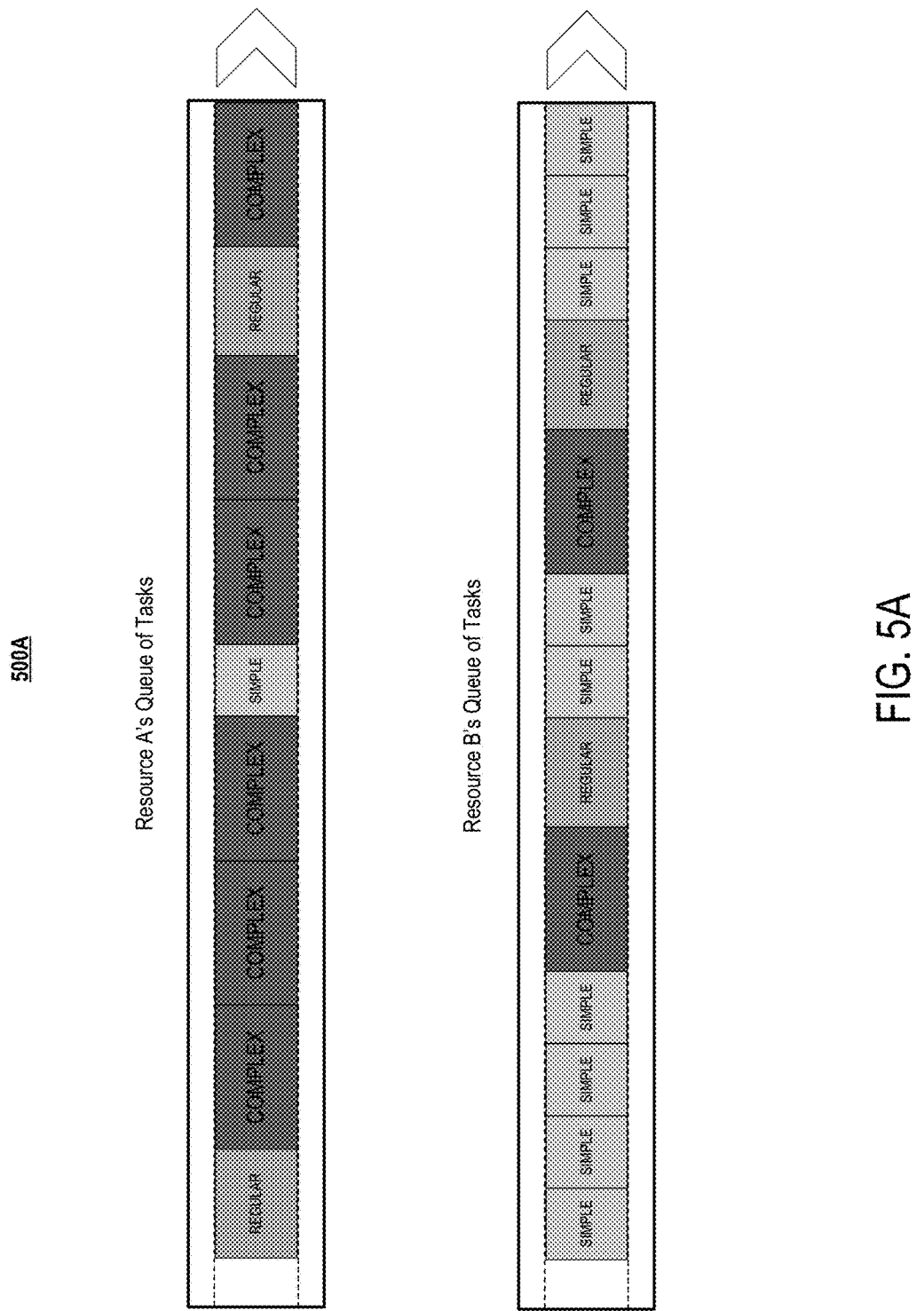
Figure 5B:
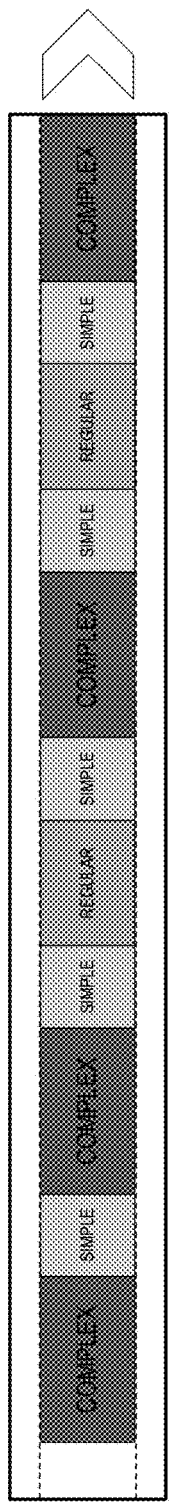
Figure 5B:
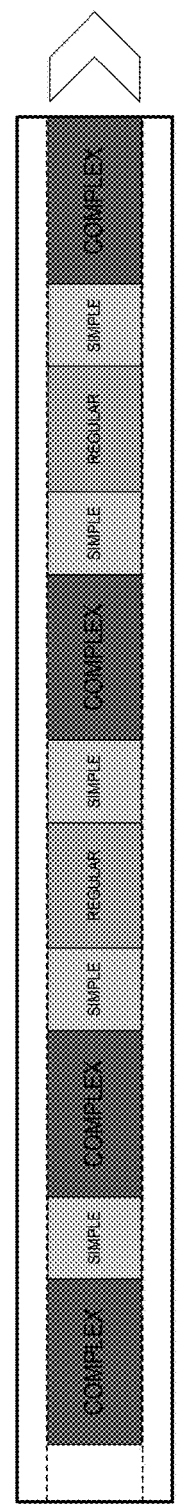

FIG. 5A and FIG. 5B illustrate queues of tasks included in generated task assignment model 500A and generated task assignment model 500B, respectively. Task assignment models 500A and 500B could be part of a set of task assignment models generated based on task information, queue information, and capability information as previously described. Task assignment models 500A and 500B include queues of tasks for two different resources: Resource A and Resource B. The queues of both resources are populated with a variety of tasks to be handled. Because business constraint rules have already been applied, these resources are definitively compatible with the tasks contained in their queues. As shown in FIG. 5A, the task assignment model 500A has assigned 6 complex tasks, 2 regular tasks, and one simple task to Resource A. Task assignment model 500A has assigned 2 complex tasks, 2 regular tasks, and 9 simple tasks to Resource B. On the other hand, the task assignment model 500B, of FIG. 5B, has assigned 4 complex tasks, 2 regular tasks, and 5 simple tasks to Resource A. Task assignment model 500B has also assigned 4 complex tasks, 2 regular tasks, and 5 simple tasks to Resource B. If optimization rules (such as those described above) operate to select a task assignment model which most evenly distributes tasks by complexity, it is clear that task assignment model 500B would be preferred over task assignment model 500A. However, as previously explained, a task assignment model's ability to yield queues that are balanced by complexity may not be the only factor in selecting an optimal task assignment model. For instance, in the example of FIG. 5A and FIG. 5B, if task assignment model 500A may actually be preferred over task assignment 500B if it is predicted to best balance an amount of time taken to handle each task across the set of resources. Ideally, the optimal task assignment model is one which optimizes all qualities of the task-handling process.

Figure 6:
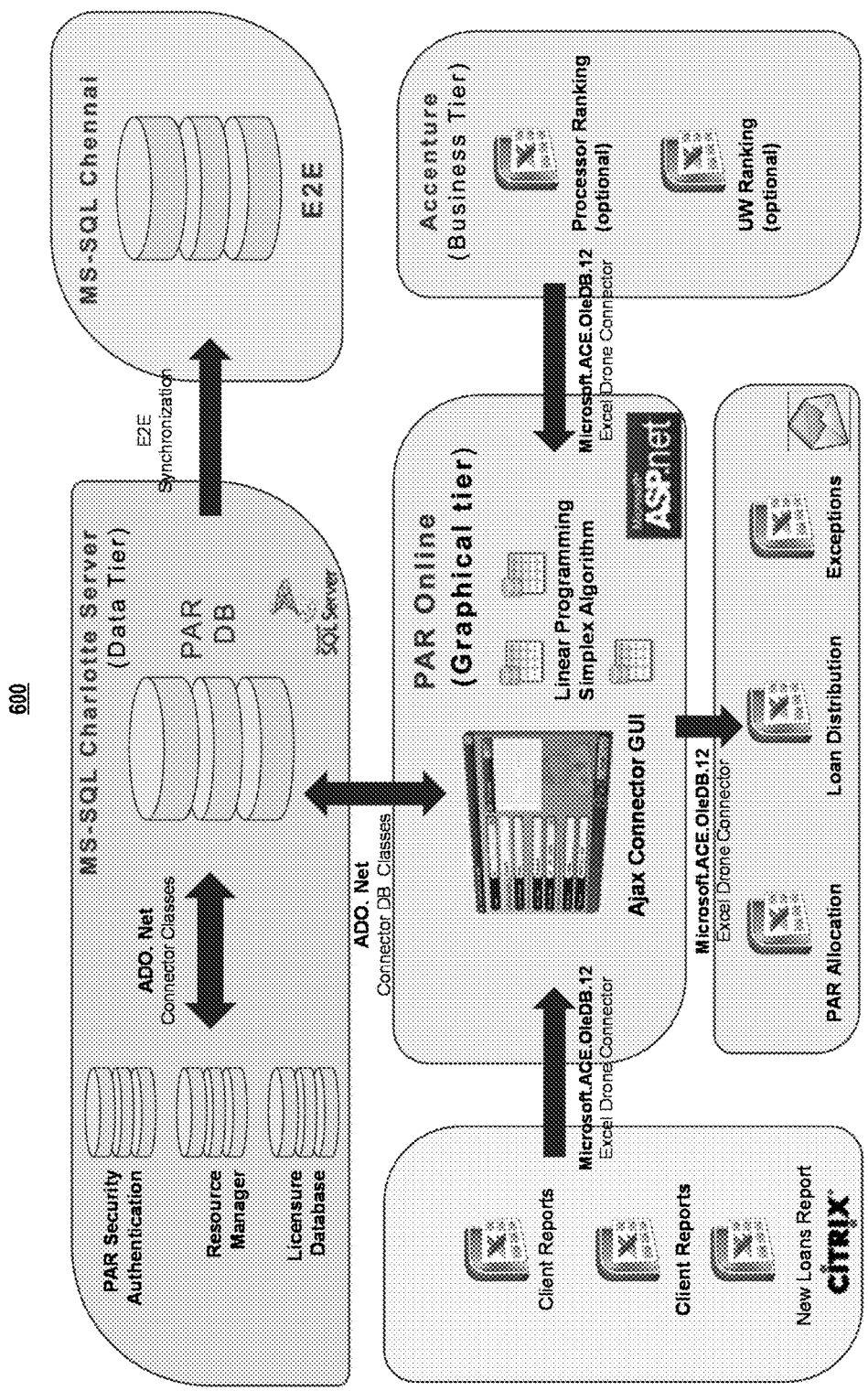

FIG. 6 illustrates another system architecture that can implement the process shown in FIG. 3. For instance, the data sources depicted in FIG. 6 can provide task information, queue information, and capability information, as previously described. As shown, task assignment may be performed by applying a linear programming simplex algorithm on the data provided by the data sources. In some implementations, at least a portion of the set of rules are applied to the task information, queue information, and capability information through the use of the linear programming simplex algorithm. System outputs, such as those depicted as being provided via the linear programming simplex algorithm, can include assignment data and feedback data as described above.

Figure 7:
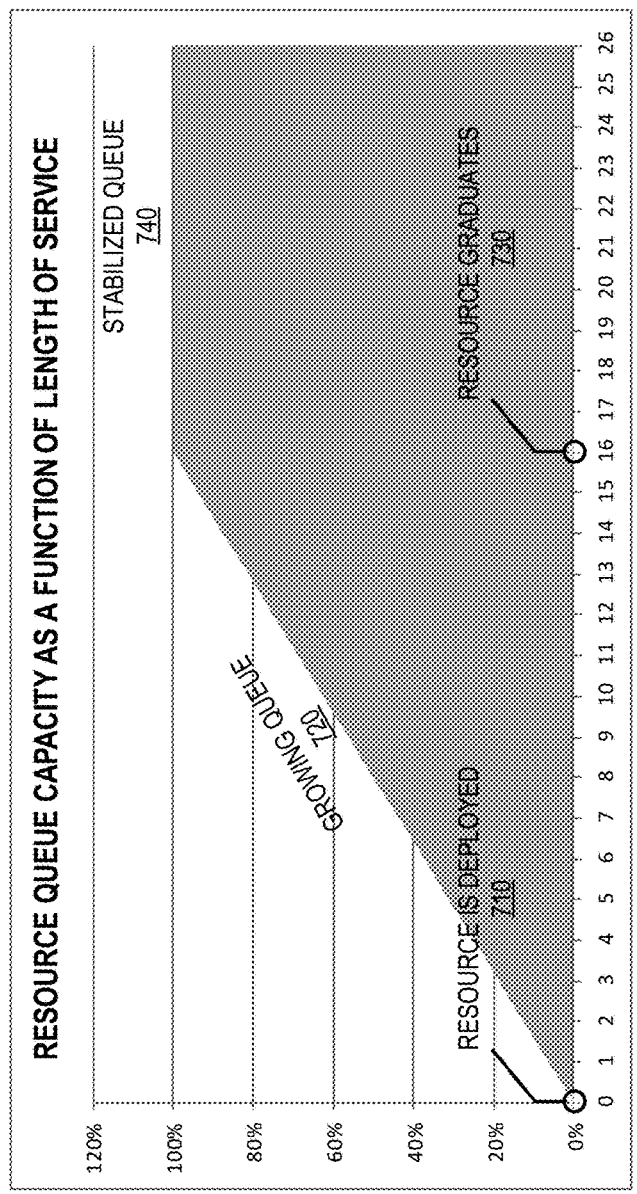
Figure 8:
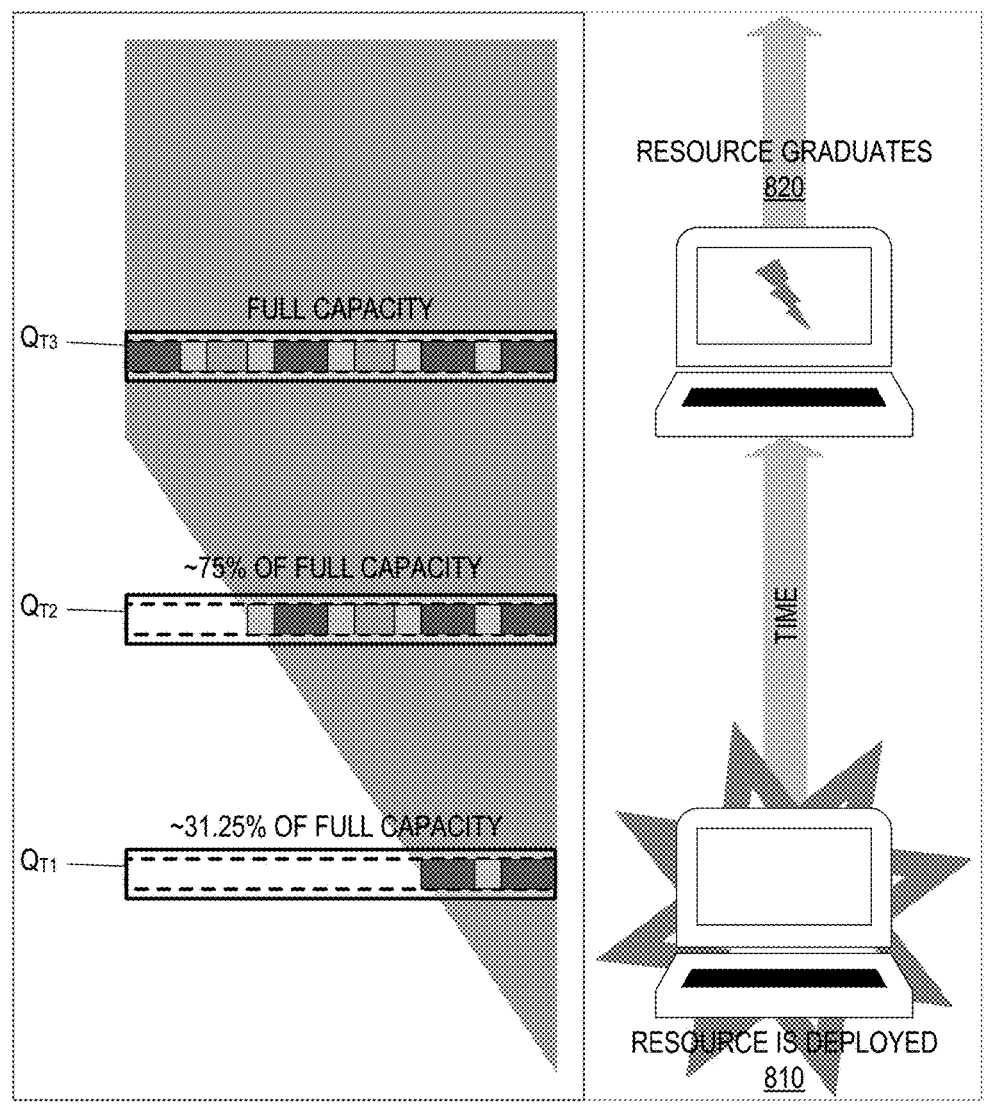

In some implementations, the system 200 may also operate to control the capacity of the queue of each resource. For instance, optimization rules could further attempt to assign tasks to queues in a manner such that each queue contains a specific number of tasks. In some examples, the specific number of tasks can differ from queue to queue. FIG. 7 illustrates the various specific numbers of tasks that can be associated with a queue of a resource. For example, the queue capacity for a resource that was more recently deployed (710) might be significantly smaller than that of a resource that was less recently deployed (730). When a resource is deployed and begins handling tasks for the first time, the set of rules applied in system 200 assigns tasks to the resource a manner which ramps up the resource's queue capacity over a predetermined period of time, so as to grow the resource's queue capacity at a predetermined rate (720). This ramp-up process allows the recently deployed resource to better ease in to task-handling, and serves to not deplete the queues of more experienced resources. The gradual increase in queue capacity is beneficial to both human-based and machine-learning resources in becoming acclimated with the process of handling tasks. Furthermore, this ramp-up process helps to ensure the effectiveness of the task assignment process, because many statistics and qualities of the newly deployed resource are unknown. That is, system 200 would not be able to accurately predict qualities of task handling if a significant portion of the tasks are being handled by a little-known resource. Therefore, this process allows the system to gradually learn information about the newly deployed resource and gradually rely upon such information in greater capacity for task assignment. After the ramp-up process is finished, the resource can be said to have "graduated" and will have a queue that remains at full capacity (740). FIG. 8 illustrates exemplary queue capacities $Q_{T1}$, $Q_{T2}$, and $Q_{T3}$ of a resource over a period of time, which includes a predetermined period of time during which the ramp-up process of FIG. 7 occurs. Capability information, as previously described, can be utilized by system 200 in determining service history (e.g. date of deployment, duration of service, etc.) for each resource and therefore how many tasks to assign to each resource at a given point in time. In some implementations, an optimal task assignment is one which yields queues of a size/capacity that most closely matches the queue size/capacity corresponding to the length of time the resource has been handling tasks (such as illustrated in FIGS. 7-8).

Figure 9:
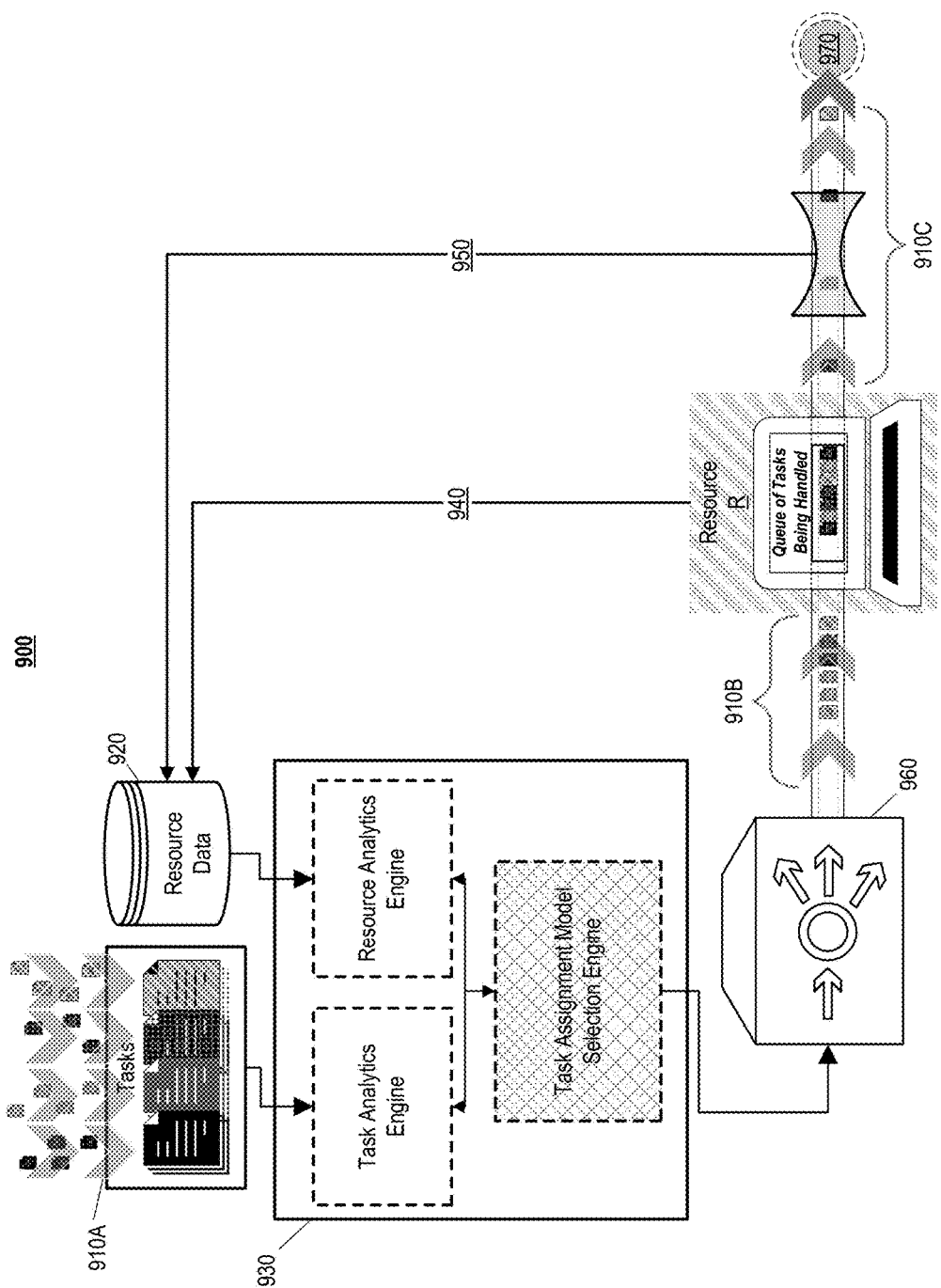

FIG. 9 illustrates an exemplary system 900 which assigns new tasks to resources on the basis of accessed task information, accessed queue information, and accessed capability information. For instance, the tasks in the system 900 are depicted in three different stages. Tasks 910A are new tasks to be assigned to a queue of a resource for handling. Task assignment system 930, which can perform the same functions as previously-described system 200, selects a queue of a resource to which to assign a subset of tasks 910A. The queue of assigned tasks 910B is sent to a Resource R by system 960, for example. Resource R then acts to incrementally handle the queue of assigned tasks 910B. As Resource R completes each task in the queue of assigned tasks, completed tasks 910C are removed from the queue of Resource R. In some implementations, the completed tasks 910C are provided to node 970. Node 970 can include one or more other resources that may perform additional tasks related to tasks 910A-910C. In these implementations, the system 900 may operate to design a network of queues between resources and take into account task-handling qualities yielded by an intricate network of resources. For instance, the package delivery example described above could include a network of resources such as delivery trucks, airplanes, sorting machinery, and their respective operators that cooperate to transport a package from its origin to its destination. In this example, system 900 could select a task assignment model that assigns tasks to resources at multiple levels of the network to optimize one or more qualities of the delivery process. In some of these implementations, system 900 could operate to split up tasks into various pieces and assign each piece to a different resource in a network of resources. Data related to Resource R (940) and to the output of Resource R (950) can be included in resource data 920, and thus relied upon in task assignment. Data 940 and 950 demonstrates at least a portion of the feedback that system 900 may utilize to assign tasks in an adaptive manner. This data may include information indicative of Resource R's productivity, current workload, and any other information previously described, such as capability information and queue information. In some implementations, this type of data is provided by every resource in the set of resources. This allows the system 900 to better control and optimize the net performance and output of the set of resources.

Figure 10:
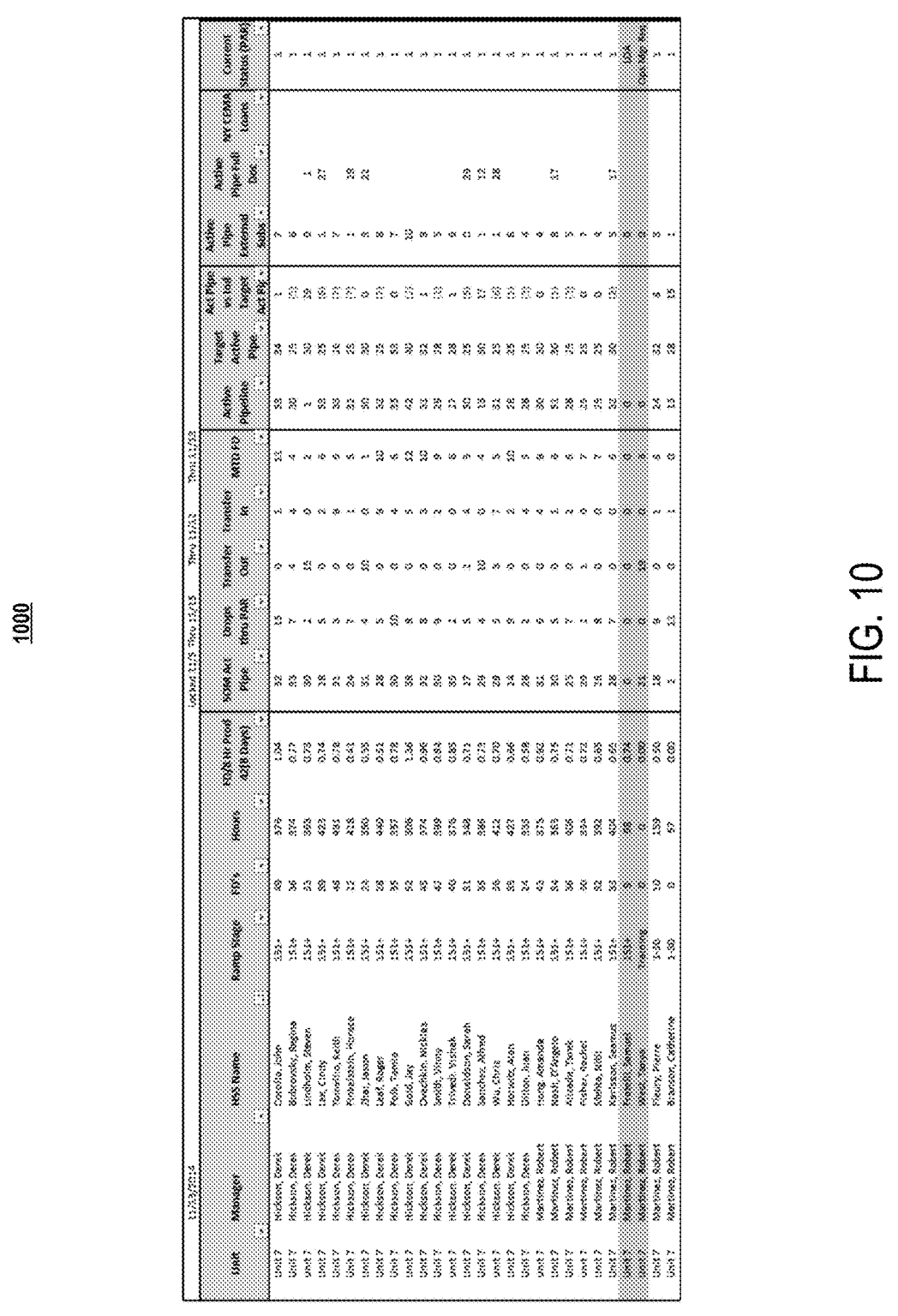

FIG. 10 illustrates an exemplary queue information and capability information for a set of resources. The information 1000 can be provided by a task data storage, resource database, task analytics engine, resource analytics engine, and feedback as described above. The information included in FIG. 10 can be used by system 200 for task assignment.

Figure 11:
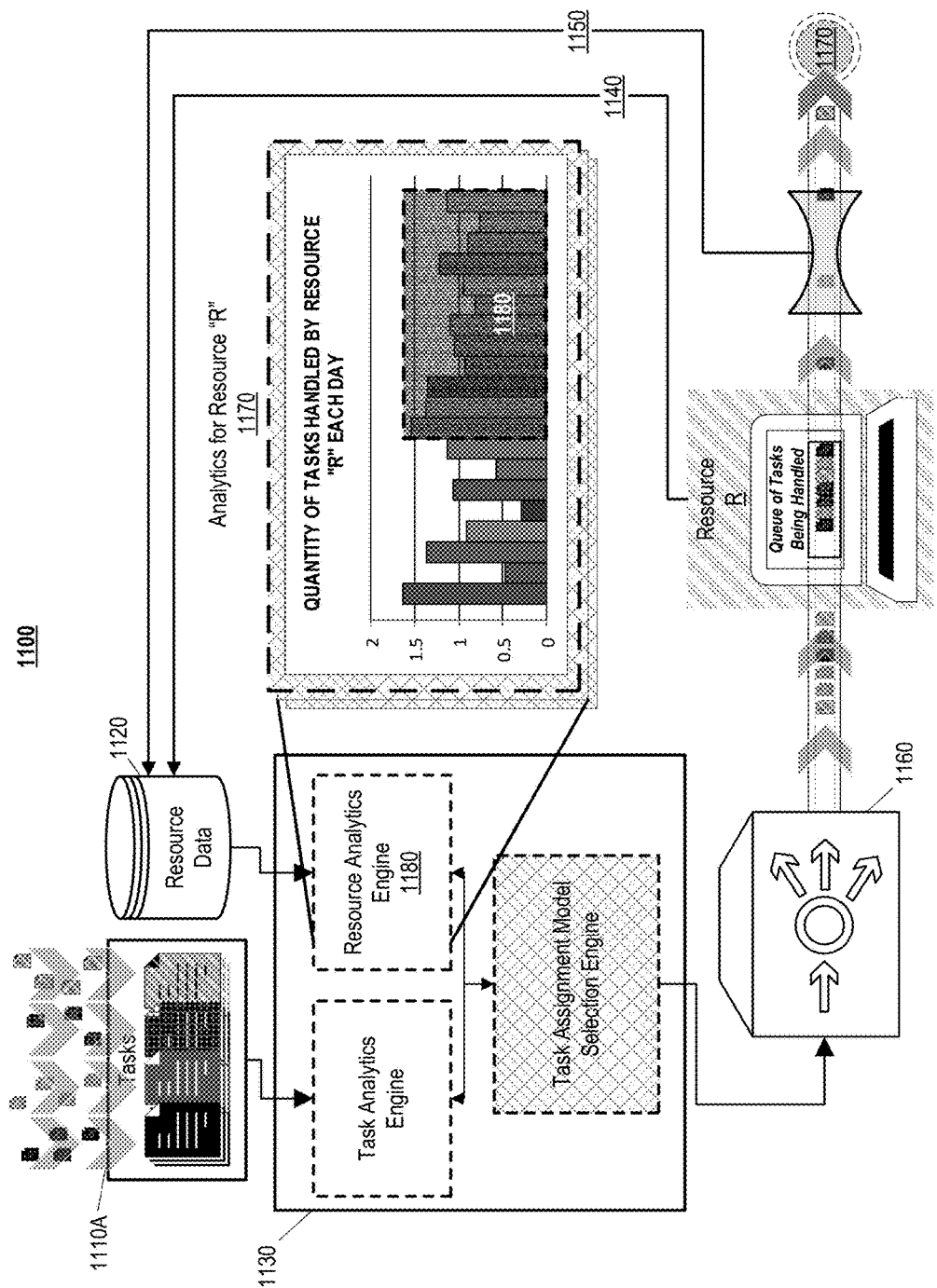

FIG. 11 illustrates an exemplary system 1100 which assigns new tasks to resources on the basis of accessed task information, accessed queue information, and accessed capability information. The system 1100 may function in the manner as system 900, as previously described. A portion of the queue information and capability information is included in analytics for Resource "R" 170. This information may be reflective of a productivity of Resource "R" over a predetermined time period 1180. In some implementations, predetermined time period 1180 is a moving window which includes a current time. That is, the productivity relied upon by in task assignment may be that which reflects a resource's most recent performance. Productivity data provided within predetermined period of time 1180 may be made available to system 1100 in real-time through feedback data 1140 and 1150 and on-the-fly analytics performed by task assignment system 1130. The length of predetermined period of time 1180 may be user-defined. In some implementations, the length of predetermined period of time 1180 is dynamically-adjusted at the control of task assignment system 1130. This might be performed in order to exclude statistical abnormalities that may be a result of a resource downtime occurring within predetermined period of time 1180. The productivity score associated with the resource may further be determined in association with the resource's number of hours of service provided. As previously described, system 1100 may use the productivity data of the set of resources in order to balance an amount of time taken to handle each task across a set of resources. For instance, this may allow the system to strategically assign tasks in a manner which maximizes the efficiency and rate of output of the set of resources. For example, if the productivity of Resource R is twice that of the average resource, it would be advantageous to stock the queue of Resource R more heavily, such that efficiency of Resource R is maximized. On the other hand, allocation of tasks to resources with relatively low productivity could be scaled back in an effort to maximize the same. The efficiency of each resource is of course related to the task at hand. For this reason, a holistic approach of taking into account task information, queue information, and capability information for the entire system 1100 increases the chances of selecting a highly efficient task assignment.

Figure 12:
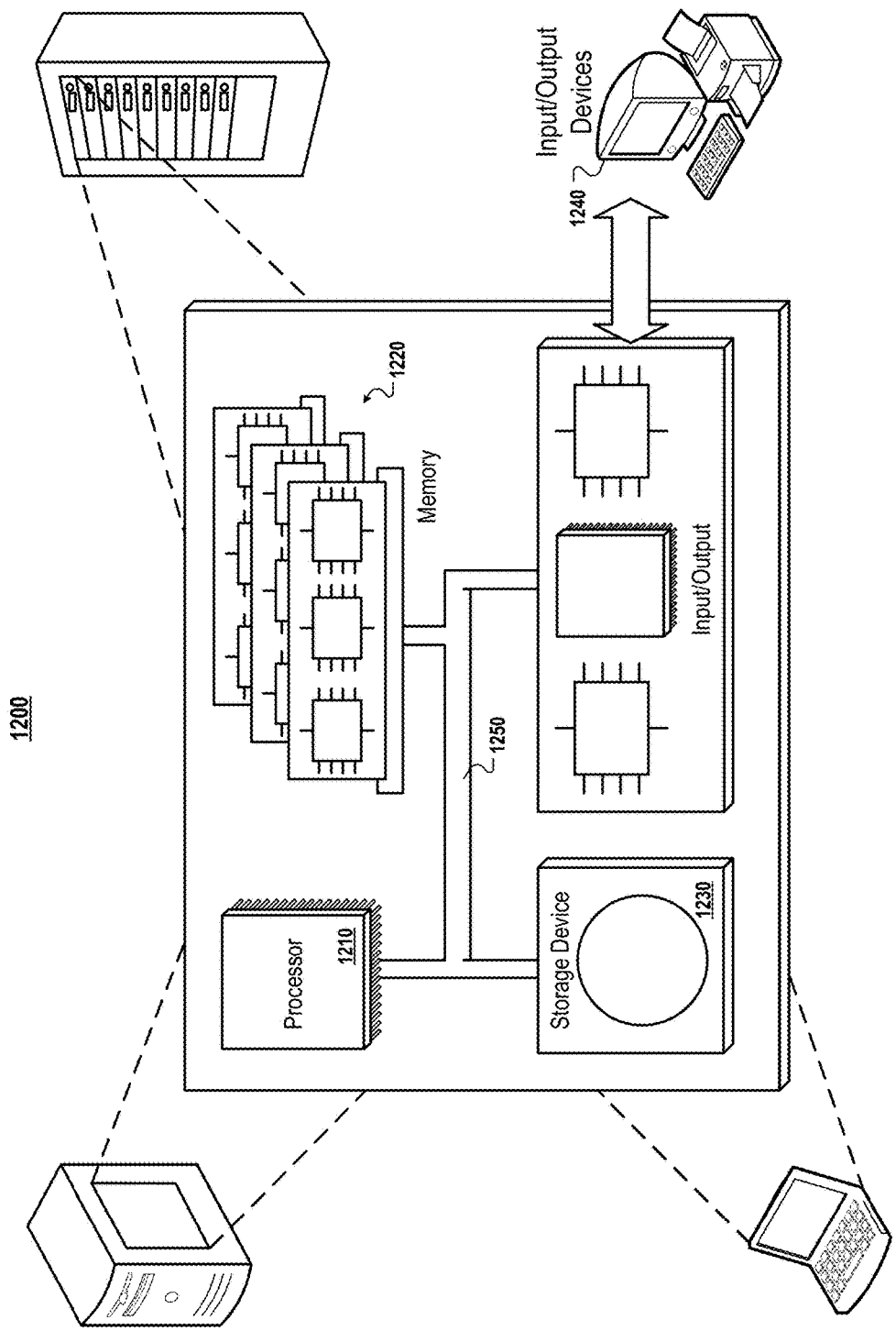

FIG. 12 is a schematic diagram of an example of a generic computer system 1200. The system 1200 can be used for the operations described in association with the processes 300 and 800 according to some implementations. The system 1200 may be included in the systems 100, 200, 400, 600, 900, and 1100.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method of distributing tasks among queues corresponding to a set of resources, the method comprising:
   accessing task information for a task to be assigned to a queue of a resource for handling,
      the task information indicating at least one requirement needed to handle the task and a complexity of the task;
   accessing first queue information descriptive of first tasks included in a first queue of a first resource available to handle tasks,
      the first queue information indicating a first number of the first tasks included in the first queue of the first resource,
      a first complexity of each of the first tasks included in the first queue of the first resource, and
      a first estimated cumulative amount of time for the first resource to handle all of the first tasks included in the first queue;
   accessing second queue information descriptive of second tasks included in a second queue of a second resource available to handle tasks,
      the second queue information indicating a second number of the second tasks in the second queue of the second resource,
      a second complexity of each of the second tasks included in the second queue of the second resource, and
      a second estimated cumulative amount of time for the second resource to handle all of the second tasks included in the second queue;
   accessing first capability information for the first resource available to handle tasks,
      the first capability information indicating first types of tasks the first resource is able to handle,
      first productivity of the first resource in handling tasks,
      a first number of tasks transferred from the first resource to other resources, and
      a second number of tasks transferred from the other resources to the first resource;
   accessing second capability information for the second resource available to handle tasks,
      the second capability information indicating second types of tasks the second resource is able to handle,
      second productivity of the second resource in handling tasks,
      a third number of tasks transferred from the second resource to the other resources, and
      a fourth number of tasks transferred from the other resources to the second resource;
   accessing, from electronic storage, a set of rules that control assignment of tasks to the first resource and the second resource to balance an amount of time taken to handle each task across the first resource and the second resource;
   evaluating, by at least one processor, against the set of rules, and to produce evaluation results, at least:
      (i) the accessed task information indicating the at least one requirement needed to handle the task and the complexity of the task,
      (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue,
      (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue,
      (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and
      (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource;
   based on the evaluation results, selecting, by the at least one processor and from among the first queue of the first resource and the second queue of the second resource, the first queue of the first resource to which to assign a first portion of the task and the second queue of the second resource to which to assign a second portion of the task; and
   based on selection of the first queue of the first resource to which to assign the task, sending, by the at least one processor, the first portion of the task to the first queue and the second portion of the task to the second queue.

2. The computer-implemented method of claim 1:
wherein accessing task information for the task to be assigned to a queue of a resource for handling comprises accessing task information for multiple tasks, each of which are to be assigned to a queue of a resource for handling, the task information indicating, for each of the multiple tasks, at least one requirement needed to handle each task and complexity of each task; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating, against the set of rules, task information for each task in the multiple tasks, the accessed first queue information, the accessed second queue information, the accessed first capability information, and the accessed second capability information.

3. The computer-implemented method of claim 2:
wherein selecting, from among the first queue of the first resource and the second queue of the second resource, the first queue of the first resource to which to assign a first portion of the task and the second queue of the second resource to which assign a second portion of the task comprises, based on the evaluation results, selecting a particular task assignment model defining the first queue of the first resource and the second queue of the second resource which the multiple tasks are to be assigned; and
wherein sending the first portion of the task to the first queue and the second portion of the task to the second queue comprises sending, in accordance with the particular task assignment model, the multiple tasks to the first resource and the second resource to be handled in parallel.

4. The computer-implemented method of claim 3:
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises generating a set of task assignment models and evaluating each task assignment model against the set of rules; and
wherein selecting the particular task assignment model defining the first queue of the first resource and the second queue of the second resource which the multiple tasks are to be assigned comprises selecting the particular task assignment model from among the set of task assignment models.

5. The computer-implemented method of claim 4:
wherein the evaluation results include a set of qualities for each of the task assignment models in the generated set of task assignment models, each set of qualities including qualities associated with the multiple tasks being handled by the first resource and the second resource as defined by the corresponding task assignment models; and
wherein selecting the particular task assignment model from among the set of task assignment models comprises selecting the particular task assignment model based on the particular task assignment model optimizing the qualities included in its corresponding set of qualities relative to other of the task assignment models.

6. The computer-implemented method of claim 1:
wherein the capability information includes schedule information for the first resource and the second resource indicating when the first resource and the second resource are expected to be available for handling tasks; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating the schedule information for the first resource and the second resource.

7. The computer-implemented method of claim 1:
wherein the at least one requirement needed to handle the task includes a requirement that the task is handled by a resource that is associated with a particular geographic location; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating a requirement that the task is handled by a resource that is associated with a particular geographic location for each task.

8. The computer-implemented method of claim 1:
wherein the at least one requirement needed to handle the task includes a requirement that the task is handled by a particular point in time; and
wherein evaluating, against the set of rules and to produce the evaluation results, at least the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating a requirement that the task is handled by a particular point in time for each task.

9. The computer-implemented method of claim 1, wherein each task comprises a task of processing data associated with at least one loan application received by a lending entity.

10. The computer-implemented method of claim 9, wherein the task of processing data associated with at least one loan application is handled at least in part by a loan processor.

11. The computer-implemented method of claim 9, wherein the task of processing data associated with at least one loan application is handled at least in part by an automated agent that automatically processes tasks associated with loan applications.

12. The computer-implemented method of claim 9:
wherein the complexity is based at least on application characteristics including characteristics of the at least one loan application, and applicant characteristics including characteristics of one or more applicants of the at least one loan application; and
wherein evaluating, against the set of rules and to produce the evaluation results, at least the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating application characteristics and applicant characteristics for each task.

13. The computer-implemented method of claim 12:
wherein the complexity of each task is reflective of an amount of time historically needed to process data associated with loan applications having the application characteristics and the applicant characteristics; and
wherein evaluating, against the set of rules and to produce the evaluation results, at least the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating complexity information reflective of an amount of time historically needed to process data associated with loan applications have the application characteristics and the applicant characteristics for each task.

14. The computer-implemented method of claim 1:
wherein the capability information indicating the types of tasks each of the first resource and the second resource are able to handle, comprises resource credential information reflective of at least one task-handling licensure level of each of the first resource and the second resource; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating resource credential information reflective of at least one task-handling licensure level of each of the first resource and the second resource.

15. The computer-implemented method of claim 1:
wherein the capability information indicating productivity of each of the first resource and the second resource are in handling tasks comprises a productivity score reflective of a quantity of tasks completed by each of the first resource and the second resource within a predetermined period of time; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating a productivity score for each of the first resource and the second resource reflective of a quantity of tasks completed by the resource within a predetermined period of time.

16. The computer-implemented method of claim 15:
wherein the predetermined period of time comprises a moving window of time, the moving window of time including a current time; and
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating the productivity score for each of the first resource and the second resource reflective of the quantity of tasks completed by the resource with a moving time window including a current time.

17. The computer-implemented method of claim 1:
wherein the set of rules that control assignment of tasks to the first resource and the second resource to balance an amount of time taken to handle each task across the first resource and the second resource further control assignment of tasks to the first resource and the second resource to increase queue capacity at a predetermined rate for more-recently deployed resources and maintain queue capacity for less-recently resources; and wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource comprises evaluating deployment information for each of the first resource and the second resource.

18. The computer-implemented method of claim 1:
wherein evaluating, against the set of rules and to produce the evaluation results, at least (i) the accessed task information indicating the at least one requirement needed to handle the task and the complexity of the task, (ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue, (iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue, (iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and (v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource, comprises predicting one or more first and second qualities of a first process of the first portion of the task and the second process of the task being handled by each of the first resource and the second resource and performing a linear programming optimization process to determine a task assignment associated with at least one optimal predicted quality for the first resource and the second resource; and wherein the method further comprises:
receiving first resource feedback indicating one or more first qualities of the first process of the first portion of the task being handled by the first resource associated with the first queue;
receiving second resource feedback indicating one or more second qualities of the second process of the second portion of the task being handled by the second resource associated with the second queue;
evaluating the one or more first predicted qualities of the first process of the first portion of the task being handled by the first resource associated with the first queue against the one or more second qualities of the second process of the second portion of the task being handled by the second resource associated with the second queue indicated by the first and second resource feedback; and
based on the evaluation results, updating one or more of the task information, queue information, capability information, and set of rules.

19. A task distribution system comprising:
at least one processor; and
at least one memory coupled to the at least one processor having stored thereon instructions which, when executed by the at least one processor, causes the at least one processor to perform operations comprising:
accessing task information for a task to be assigned to a queue of a resource for handling,
the task information indicating at least one requirement needed to handle the task and a complexity of the task;
accessing first queue information descriptive of first tasks included in a first queue of a first resource available to handle tasks,
the first queue information indicating a first number of the first tasks included in the first queue of the first resource,
a first complexity of each of the first tasks included in the first queue of the first resource, and
a first estimated cumulative amount of time for the first resource to handle all of the first tasks included in the first queue;
accessing second queue information descriptive of second tasks included in a second queue of a second resource available to handle tasks,
the second queue information indicating a second number of the second tasks in the second queue of the second resource,
a second complexity of each of the second tasks included in the second queue of the second resource, and
a second estimated cumulative amount of time for the second resource to handle all of the second tasks included in the second queue;
accessing first capability information for the first resource available to handle tasks,
the first capability information indicating first types of tasks the first resource is able to handle,
first productivity of the first resource in handling tasks,
a first number of tasks transferred from the first resource to other resources, and
a second number of tasks transferred from the other resources to the first resource;
accessing second capability information for the second resource available to handle tasks,
the second capability information indicating second types of tasks the second resource is able to handle,
second productivity of the second resource in handling tasks,
a third number of tasks transferred from the second resource to the other resources, and
a fourth number of tasks transferred from the other resources to the second resource;
accessing, from electronic storage, a set of rules that control assignment of tasks to the first resource and the second resource to balance an amount of time taken to handle each task across the first resource and the second resource;
evaluating, by at least one processor, against the set of rules, and to produce evaluation results, at least:
(i) the accessed task information indicating the at least one requirement needed to handle the task and the complexity of the task,
(ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue,
(iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue,
(iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and
(v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource;
based on the evaluation results, selecting, by the at least one processor and from among the first queue of the first resource and the second queue of the second resource, the first queue of the first resource to which to assign a first portion of the task and the second queue of the second resource to which to assign a second portion of the task; and
based on selection of the first queue of the first resource to which to assign the task, sending, by the at least one processor, the first portion of the task to the first queue and the second portion of the task to the second queue.

20. At least one non-transitory computer-readable storage medium encoded with executable instructions that, when executed by at least one processor, cause the at least one processor to perform operations comprising:

accessing task information for a task to be assigned to a queue of a resource for handling,
the task information indicating at least one requirement needed to handle the task and a complexity of the task;

accessing first queue information descriptive of first tasks included in a first queue of a first resource available to handle tasks,
the first queue information indicating a first number of the first tasks included in the first queue of the first resource,
a first complexity of each of the first tasks included in the first queue of the first resource, and
a first estimated cumulative amount of time for the first resource to handle all of the first tasks included in the first queue;

accessing second queue information descriptive of second tasks included in a second queue of a second resource available to handle tasks,
the second queue information indicating a second number of the second tasks in the second queue of the second resource,
a second complexity of each of the second tasks included in the second queue of the second resource, and
a second estimated cumulative amount of time for the second resource to handle all of the second tasks included in the second queue;

accessing first capability information for the first resource available to handle tasks,
the first capability information indicating first types of tasks the first resource is able to handle,
first productivity of the first resource in handling tasks,
a first number of tasks transferred from the first resource to other resources, and
a second number of tasks transferred from the other resources to the first resource;

accessing second capability information for the second resource available to handle tasks,
the second capability information indicating second types of tasks the second resource is able to handle,
second productivity of the second resource in handling tasks,
a third number of tasks transferred from the second resource to the other resources, and
a fourth number of tasks transferred from the other resources to the second resource;

accessing, from electronic storage, a set of rules that control assignment of tasks to the first resource and the second resource to balance an amount of time taken to handle each task across the first resource and the second resource;

evaluating, by at least one processor and against, against the set of rules, and to produce evaluation results, at least:
(i) the accessed task information indicating the at least one requirement needed to handle the task and the complexity of the task,
(ii) the accessed first queue information indicating the first number of the first tasks included in the first queue of the first resource, the first complexity of each of the first tasks included in the first queue of the first resource, and the first estimated cumulative amount of time for the first resource to handle all of the first tasks included in the first queue,
(iii) the accessed second queue information indicating the second number of the second number of the second tasks included in the second queue of the second resource, the second complexity of each of the second tasks included in the second queue of the second resource, and the second estimated cumulative amount of time for the second resource to handle all of the second tasks included in the second queue,
(iv) the first accessed capability information indicating the first types of tasks the first resource is able to handle, the first productivity of the first resource in handling tasks, the first number of tasks transferred from the first resource to the other resources, and the second number of tasks transferred from the other resources to the first resource, and
(v) the second accessed capability information indicating the second types of tasks the second resource is able to handle, the second productivity of the second resource in handling tasks, the third number of tasks transferred from the second resource to the other resources, and the fourth number of tasks transferred from the other resources to the second resource;

based on the evaluation results, selecting, by the at least one processor and from among the first queue of the first resource and the second queue of the second resource, the first queue of the first resource to which to assign a first portion of the task and the second queue of the second resource to which to assign a second portion of the task; and based on selection of the first queue of the first resource to which to assign the task, sending, by the at least one processor, the first portion of the task to the first queue and the second portion of the task to the second queue.

* * * * *

UNITED STATES PATENT AND TRADEMARK OFFICE
CERTIFICATE OF CORRECTION

PATENT NO. : 10,049,332 B2
APPLICATION NO. : 14/644975
DATED : August 14, 2018
INVENTOR(S) : David C. Jones et al.

It is certified that error appears in the above-identified patent and that said Letters Patent is hereby corrected as shown below:

In the Claims

In Column 20, Claim 1, Line 36, delete "second number of the".

In Column 21, Claim 2, Line 21, delete "second number of the".

In Column 22, Claim 4, Line 9, delete "second number of the".

In Column 23, Claim 6, Line 3, delete "second number of the".

In Column 23, Claim 7, Line 44, delete "second number of the".

In Column 24, Claim 8, Line 6, after "least" insert -- (i) --.

In Column 24, Claim 8, Line 16, delete "second number of the".

In Column 24, Claim 12, Line 59, after "least" insert -- (i) --.

In Column 25, Claim 12, Line 2, delete "second number of the".

In Column 25, Claim 13, Line 33 (approx.), after "least" insert -- (i) --.

In Column 25, Claim 13, Line 43, delete "second number of the".

In Column 26, Claim 14, Line 19, delete "second number of the".

In Column 26, Claim 15, Line 61, delete "second number of the".

In Column 27, Claim 16, Line 34, delete "second number of the".

Signed and Sealed this
Twenty-third Day of October, 2018

Andrei Iancu
*Director of the United States Patent and Trademark Office*

CERTIFICATE OF CORRECTION (continued)
U.S. Pat. No. 10,049,332 B2

In Column 28, Claim 17, Line 12, delete "second number of the".

In Column 28, Claim 18, Line 47, delete "second number of the".

In Column 30, Claim 19, Line 33, delete "second number of the".

In Column 32, Claim 20, Line 4, delete "processor and against," and insert -- processor, --, therefor.

In Column 32, Claim 20, Line 19, delete "second number of the".